Feb. 25, 1936.  M. A. GARRISON  2,031,828
BOOSTER
Filed Dec. 10, 1932  3 Sheets-Sheet 1
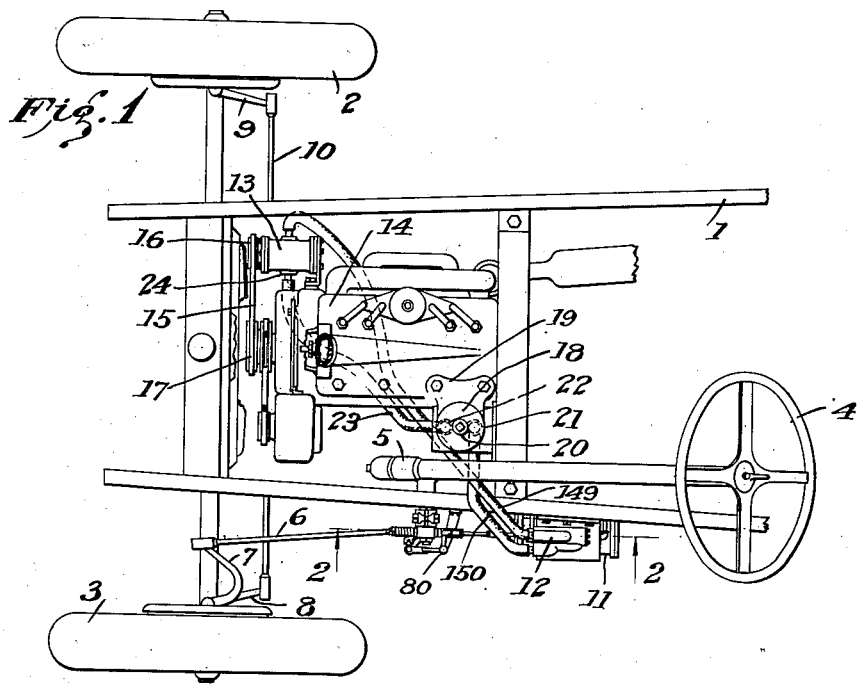
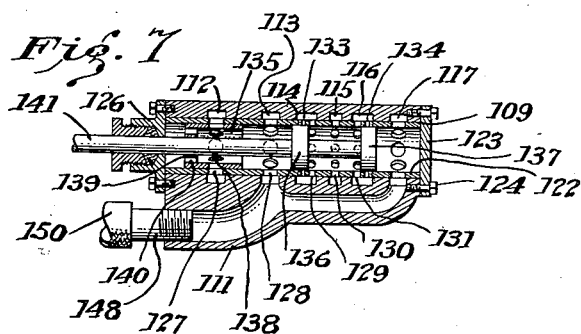
INVENTOR:
Marion Ames Garrison,
Calvin Brown,
ATTORNEYS.

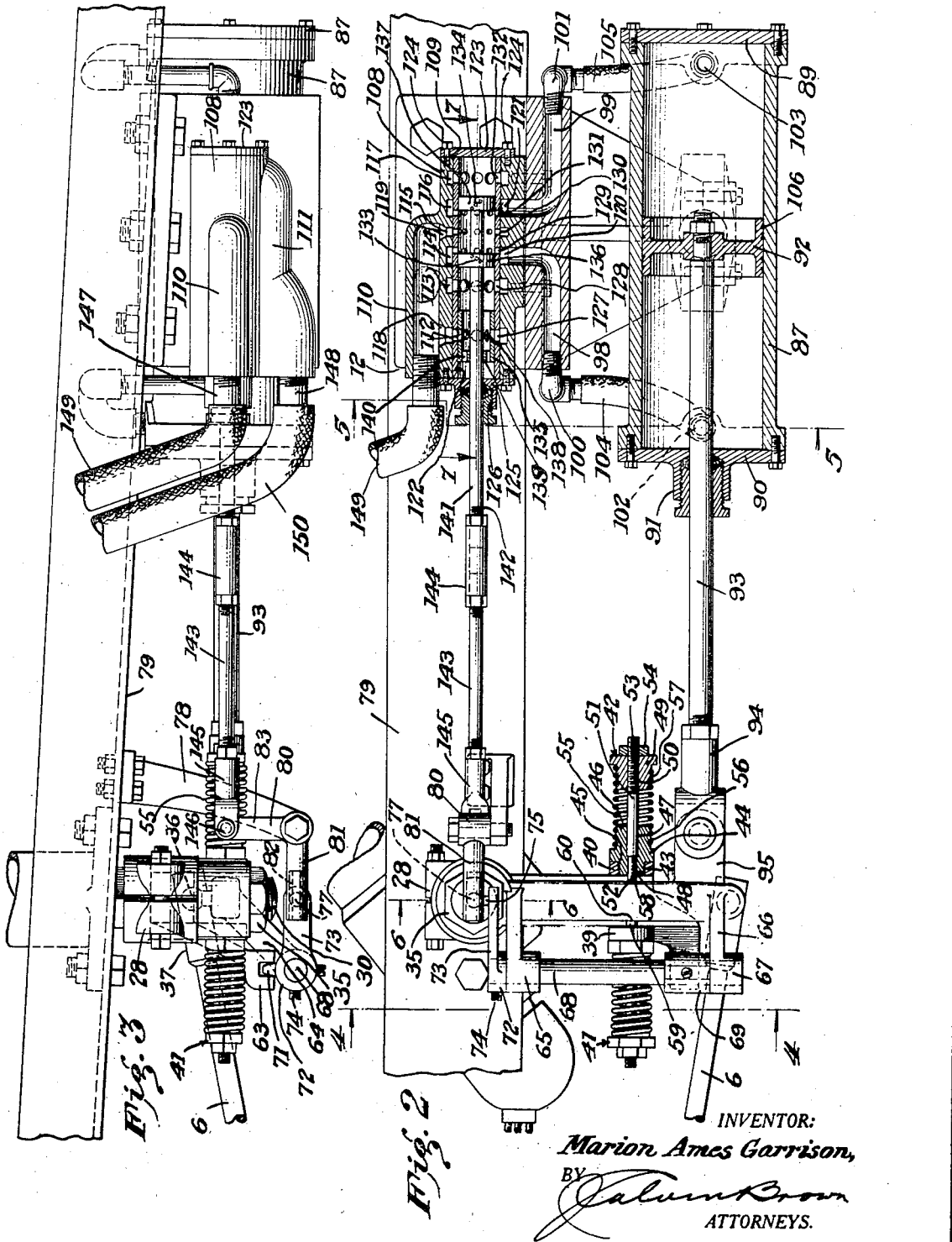

Feb. 25, 1936. M. A. GARRISON 2,031,828
BOOSTER
Filed Dec. 10, 1932 3 Sheets-Sheet 3
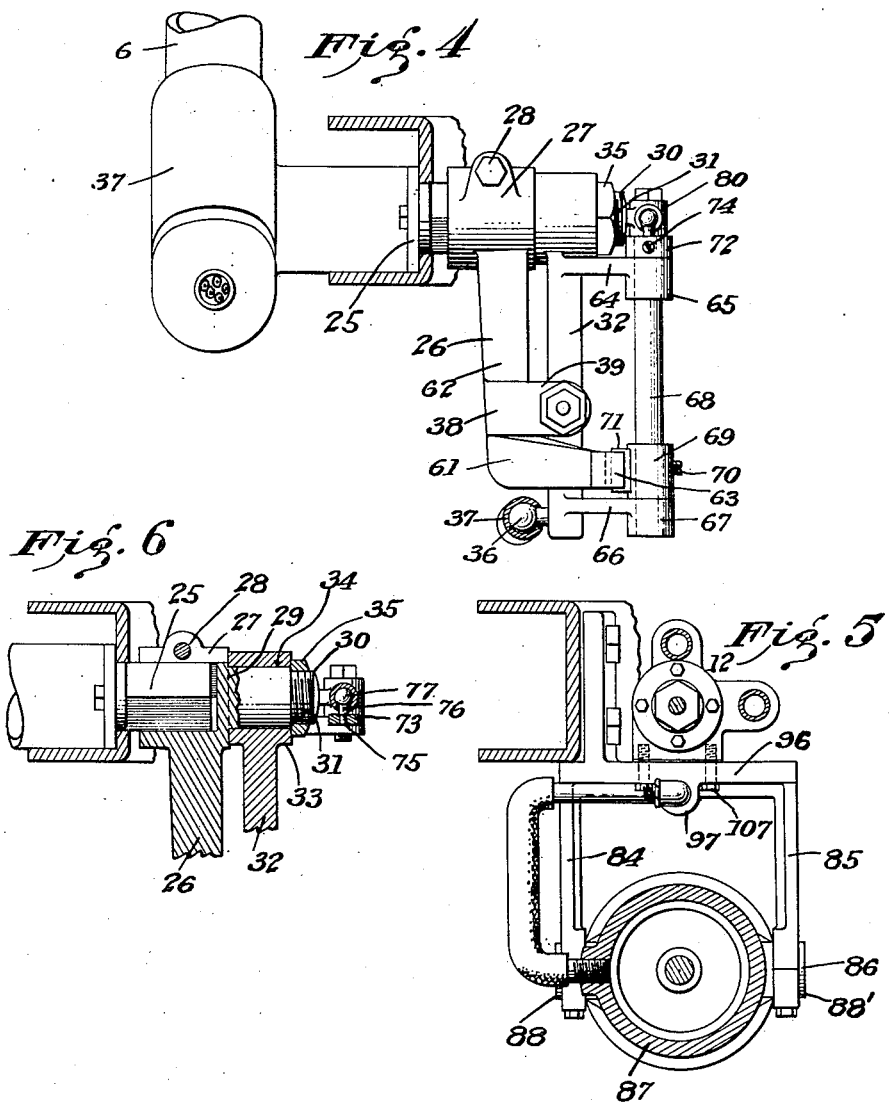

Patented Feb. 25, 1936

2,031,828

UNITED STATES PATENT OFFICE 2,031,828

BOOSTER

Marion Ames Garrison, Alhambra, Calif.

Application December 10, 1932, Serial No. 646,677

9 Claims. (Cl. 121—41)

This invention relates generally to boosters, and more particularly to that type of booster adapted to be utilized in conjunction with the steering mechanism of motor vehicles.

The invention, however, is adaptable for various uses where it is desired to move mechanism normally under manual control. As an example, and considering the use of the invention with the steering elements of a motor vehicle, the steering of said vehicle is directly controlled by an operator thereof during any turning movement of the wheels of a vehicle, the present invention acting to assist in said turning, to the end that physical fatigue of the operator is prevented. In this respect, the device is applicable to all types of vehicles, such as heavy trucks and the like.

A further object is the provision of means of the character stated which assists in moving some means during simultaneous movement of a control device normally used for moving said means.

With respect to the foregoing object, it is elementary that in a vehicle, some hand control, such as a steering wheel, is utilized, together with suitable connections between said steering wheel and the turnable wheels of the vehicle. As the steering wheel is turned, the vehicle wheels are normally moved in one direction or the other. This constitutes the manual operation. I provide with my invention, a device directly controllable by movement of the steering wheel and associated with the steering mechanism for moving the vehicle wheels whereby turning of the steering wheel will cause my invention to operate in step with said turning, so that the normal effort used to turn the wheels is reduced to any degree desired, and my invention consists in the novel and useful provision of means for accomplishing this desired function.

Another object is the provision of means which is fool-proof in construction, and in the case of the adaptation of the invention for steering purposes, will not interfere with the regular steering even though a portion of the mechanism of this invention should fail to operate or be broken.

Another object is the provision of a device of the character stated, consisting of few parts which are readily assembled in position of service without the necessity of changing, to any appreciable degree, mechanism with which it is to be associated.

Other objects consist in the novel and useful provision of a valve adapted to function in an efficient and fool-proof manner in carrying out the functions of the invention.

Other objects include a device which is simple of construction, inexpensive in cost of manufacture, requires few parts, is not easily broken, readily adaptable for various uses and purposes, and capable of producing efficient results.

With the above and other object in view, the invention consists in the novel and useful provision, formation, construction, association, and relative arrangement of parts, members and features, all as shown in certain embodiments in the accompanying drawings, described generally, and more particularly pointed out in the claims.

In the drawings:

Figure 1 is a fragmentary top plan view of a vehicle incorporating the invention, Figure 2 is an enlarged sectional view, partly broken away, and taken substantially on the line 2—2 of Figure 1, Figure 3 is a plan view of the mechanism shown in Figure 2, Figure 4 is a fragmentary view on the line 4—4 of Figure 2, Figure 5 is a sectional view on the line 5—5 of Figure 2, Figure 6 is an enlarged view, partly in fragment, and on the line 6—6 of Figure 2, and, Figure 7 is a view on the line 7—7 of Figure 2.

Referring now with particularity to the drawings, in Figure 1 I have shown fragmentarily the frame 1 of a motor vehicle provided with dirigible wheels 2 and 3 adapted to be conjointly moved, normally, when a steering wheel 4 is rotated, which steering wheel, through the medium of the usual worm and sector or equivalent means 5 actuates a steering arm thrust rod 6 to in turn move a knuckle arm 7, this knuckle arm being adapted to directly cause movement of the wheel 3 and through the medium of steering knuckles 8 and 9 and a drag link or tie rod 10, actuate the wheel 2. The parts just mentioned are, of course, well known in the art.

My invention is adapted to operate in conjunction with the steering mechanism and particularly that portion included between the worm and sector 5 and the thrust rod 6. I may locate my invention in other positions, depending upon use of the invention, but for the present I am simply describing my invention in one environment, to-wit, to assist in the steering operation of a vehicle. With the environment stated in view, I have provided means 11 adapted to be fluid actuated to in turn cause movement of the thrust rod 6, together with means 12 controlling the admisson of a fluid to the said means 11 under direct control of the steering mechanism before recited, and which fluid is maintained under pressure within suitable limits by a pump 13.

The pump 13 is conventional in form and, in the present instance, is of the rotary type and adapted to circulate a fluid or at least to maintain a pressure in the line, the details of said pump not being shown as no particular type of pump is contemplated. This said pump, assuming it to be the rotary type, may be secured by means of a bracket, to a portion of an engine 14 carried by the motor vehicle, the said pump being driven by a continuous belt 15 passed over a pulley 16 of the pump and a pulley 17 carried by the crank shaft.

In the present embodiment of the invention, I prefer to circulate an oil and in this connection, I provide a tank 18 adapted to hold a body of oil and which tank is secured through the medium of a bracket or the like to the motor block 14, as shown at 19. The usual filler plug 20 is provided for the tank. The tank has an inlet and an outlet, as shown at 21 and 22, and a suitable tube connection 23 leads from the outlet of said tank to the intake opening 24 of the pump.

The remaining tube connections between the pump and the tank and the association thereof with the means 12 will be set forth later. At the present time, certain of the connections that exist between the worm and sector and the thrust rod 6 will be described.

Referring to Figures 4 and 6, I preferably use in conjunction with my invention an irreversible type of steering gear. This steering gear incorporates what is known as a worm wheel shaft 25, and this worm wheel shaft has a squared portion. What I term the primary steering arm 26 is provided with a boss 27 having a squared opening adapted to receive the squared portion of the shaft 25, as see Figure 6. The usual form of clamp 28 is adapted to secure the boss in tight engagement with the square. The said boss 27 is provided with an extension 29 substantially presenting a circular periphery and with a portion 30 of reduced diameter and likewise screw-threaded, as shown at 31. A secondary steering arm 32 is provided with a boss 33 formed with a through bore 34 through which the extension 29 is passed. A nut 35 is secured to the threads 31 for maintaining the boss 33 in position upon the extension 29. It will be seen that whereas the primary steering arm 26 is positively moved through the worm and gear arrangement 5, that the secondary arm 32 is not of necessity positively moved. Usually, the primary steering arm 26 is directly connected to the thrust rod 6. In the present instance, the thrust rod 6 is actuated by the secondary steering arm 32, the secondary steering arm to this end carrying a ball 36 received within a socket 37 on one end of the thrust rod 6. In order that movement should occur in the secondary arm when the primary arm is manually moved, I provide the primary steering arm with a yoke or bifurcated member 38, the furcations 39 and 40 of which spacedly straddle opposite side edges of the secondary arm 32. In order to cause movement of the secondary arm 32 when the arm 26 is positively moved, I provide members 41 and 42. These members are identical in construction and are carried by the furcations of the yoke. One of said members will be described. The furcation 40, as is likewise the furcation 39, is provided with a transverse threaded bore 43. A reducer type nut 44 is provided with external screw-threads 45 adapted for threaded engagement with the threads in the bore 43 of the yoke. This nut is further reduced as to diameter at 46 and is formed with two central bores of different diameters, as shown at 47 and 48. A flanged nut 49 is provided with a central screw-threaded bore 50. A pin or stem 51 having a portion of reduced diameter at 52 is passed through the bores of the member 44, being shouldered within the portion of reduced diameter of said member, with an end of said pin projecting beyond the inner surface of the furcation 40. The periphery of said pin adjacent its opposite end is provided with threads 53, which threads engage the threads 50 of the nut 49. A lock nut is shown for the assemblage at 54. Interposed between the nuts 44 and 49 and particularly between the flange portions thereof is a coil spring 55. The peripheries of the members 44 and 49 are threaded, as shown at 56 and 57, and a portion of the coils of said springs adjacent both ends thereof is adapted for engagement with the said threads 56 and 57. Compression of the spring between the members 44 and 49 is, to a certain degree, regulated by adjusting the nut 49 upon the threads 53. It will be seen that the spring may be put under tension by pushing against the end 58 of the stem 51. The spring will be held to resist movement of the stem by its threaded engagement with the members 44 and 49. When the spring is secured to the threads of the said members 44 and 49, the original threading occurs in a direction tending to uncoil the spring. However, if there is any tendency for the spring to release from the threads, the spring will tend to coil in an opposite direction, with the result that the coils become lesser in diameter and more closely and tightly grip the threads of said members. Thus, there is no danger of the spring becoming loose. As stated, the construction for the opposite member 41 is identical. For convenience of description, the stem or pin for the member 41 is designated as 59. The end 58 of the pin 51 and the inner end 60 of the pin 59 engage opposite sides of the secondary steering arm. Thus, when the primary steering arm is moved, the secondary steering arm which is floating upon the boss 33, will likewise be moved under spring tension. For instance, viewing Figure 2, the ends 58 and 60 of the pins engage sides of the secondary steering arm and are prevented from further movement thereagainst by the shouldering of the pins within the portions of reduced diameter of the members 44. Hence, if the primary steering arm is rotated clockwise, viewing Figure 2, the spring of the member 42 will be placed in tension for the reason that the yoke 38 which carries the said members 41 and 42, is fixedly carried by the primary steering arm; hence, pressure will be exerted against one side of the secondary steering arm by the pin 51. If great resistance to movement of the secondary steering arm should occur, the spring of the member 42 will be placed in considerable tension; however, the pin 59, particularly the end 60, will not follow movement of the secondary steering arm due to the shouldered relationship that exists between the said pin and the member 44.

It is to be remembered that the yoke 38 is fixedly carried by the primary steering arm and therefore the movement of said arm is directly communicated to the secondary steering arm through the medium of the members 41 and 42. The secondary steering arm is not subject to any direct stress, and for that reason will not under ordinary circumstances fail to move in step with the primary arm. However, sudden movement of the primary steering arm causes a lag in movement of the secondary steering arm due to inertia of moving parts, and the like, and the moment this inertia is overcome through the medium of the members 41 and 42, the secondary steering arm will commence movement. The members 41 and 42 perform many useful functions in the present invention, as will appear in the statement of operation.

The primary steering arm 26 at its lowermost end carries an arm 61 which is substantially at right angles to the longitudinal plane of said steering lever and likewise at an angle to the side face 62 of the lever 26. Said arm 61 is provided with a forked extremity 63.

The secondary arm 32 is provided adjacent the boss portion with an outstanding bracket 64 terminating in a boss 65 and likewise provided adjacent the opposite end of said arm 32 with a bracket 66 terminating in a boss 67. The brackets 64 and 66 are in alignment. Extending between the said bosses 65 and 67 and projecting beyond the boss 65 is a shaft 68. Carried on the shaft and adjacent to and above the boss 67 is a collar 69 which is held to rotate with said shaft by suitable means, such as shown at 70, comprising a lock screw. Any other means might be utilized for locking the collar 69 to the shaft. The said collar is provided with a radial stud 71 adapted to be received between the forks of the forked end 63 of the arm 61. This stud is provided with curved sides and resembles the tooth of a pinion, as see Figure 3. The uppermost end of the said shaft 68 has secured thereto and above the boss 65 a hub 72 of a lever 73, by means of a set screw or the like 74. The lever 73 is provided at 75 with a stud 76 having a ball head 77. The center of the ball head substantially centers with the longitudinal axis of the boss 27, extension 29, and the screw-threaded reduced portion 30.

A bracket 78 is secured to the vehicle framing and particularly the side framing member 79, and this said bracket pivotally carries a bell crank 80. One arm 81 of said bell crank is provided with an elongated split socket 82 adapted to slidably receive therein the ball head 77. The opposite lever 83 of the said bell crank is associated with valve apparatus, as will hereinafter appear.

Adapted to be secured to the framing 79 is a casting including a pair of spaced brackets 84 and 85, which brackets are provided with journal portions 86. Received between the said brackets is a cylinder 87 constituting a portion of the means 11. This cylinder is provided with a pair of diametrically arranged trunnions 88 and 88', adapted to be received in the journal portions of the brackets, whereby the said cylinder may be rocked. The said cylinder is provided at one end with a closure cap 89 and the opposite end with a cap 90 provided with a stuffing box 91. A piston 92 is within the cylinder and the piston stem 93 is passed through the stuffing box and carries exterior the cylinder a yoke 94. This yoke is adapted to be pivotally secured to an extension 95 formed on the secondary lever arm 32 and adjacent the outermost extremity thereof. This construction permits the cylinder to rock as the piston moves within the said cylinder responsive to rocking movement of the secondary lever arm. The bracket 85 has two portions at substantially right angles, to-wit, the portion that carries the journal and the portion at 96. This portion 96 acts as a supporting top for a valve that controls admission of fluid under pressure to the cylinder and, in this connection, the portion 96 is enlarged at 97 and provided with a pair of ports 98 and 99. These ports, in each instance, enter at one end of the said enlargement and are curved upwardly so as to have an opening in the top surface of said member 96, as best illustrated in Figure 2. Suitable connectors 100 and 101 are screw-threadedly received within the ports 98 and 99 and suitable connectors 102 and 103 are screw-threaded in transverse openings adjacent ends of said cylinder 87, as shown in Figures 2 and 5. Flexible tubes 104 and 105 extend between the connectors 100 and 102, and 101 and 103. The periphery of the head of the piston is provided with circumferential right-triangled grooves 106. This grooved arrangement has been found to operate efficiently in the present invention. Any number of grooves may be provided, although in the present instance, there are two grooves facing one direction relative to the piston head and two grooves facing the opposite direction, so far as the hypotenuse portions of said grooves are concerned.

Carried on the top surface of the part 96 of the casting and secured thereto by any suitable means, such as shown at 107, is the means 12, which controls admission of fluid under pressure to the cylinder. The means 12 includes a housing 108 provided with a longitudinal bore 109, and a pair of spaced manifold members 110 and 111. The interior of said housing 108 is provided with annular grooves 112 to 117, inclusive. These annular grooves function as ports. A transverse opening 118 permits communication between the interior of the manifold 110 and the annular groove 112, and a transverse bore 119 permits communication between said manifold and the groove 115. The housing is likewise transversely bored at 120 and 121, and which bores respectively communicate with the ports 98 and 99. The manifold 110 is known as the "inlet" and the manifold 111 as the "outlet". The manifold 111 communicates with the annular grooves 113 and 117.

Closely confined within the bore 109 is a sleeve or cage 122. One end of said sleeve or cage abuts against an end cap 123 held by means 124 to one end of the said housing 108. The opposite end of said housing is closed by a cap 125 provided with a stuffing box 126. This said cage or sleeve is provided with transverse spaced bores, annularly arranged and adapted to communicate with the annular grooves in the housing, as shown at 127 to 132, inclusive. The transverse bores are not all of the same diameter. For instance, the transverse bores 129, 130 and 131 are of smaller diameter than the transverse bores previously enumerated. The said sleeve or cage is likewise provided with small groups of annularly related transverse bores designated for the entire group as 133 and 134, the group 133 communicating with the annular groove 114 and the group 134 with the annular groove 116. Adapted for movement within the said sleeve or cage are valves 135, 136 and 137. The valve 135 is of the sleeve type, in that it comprises a tubular member, the periphery of which is fitted fairly tightly within the bore 109 of the housing 108, and which member is provided with a plurality of annularly arranged transverse bores 138 adapted to register in the position shown in Figure 2 with the transverse bores 127. This sleeve is provided at one end with a spider 139, this construction permitting openings 140 between arms of the spider. The other valve members 136 and 137 are conventional in form, being in the nature of a piston head and all of the said valve members are secured together for joint movement through the medium of a stem 141, the said stem being passed through the stuffing box 125. The stem is screw-threaded at 142, and a secondary stem 143 is coupled with the stem 141 through the medium of a turnbuckle 144. The stem 143 carries a yoke 145, this yoke being pivoted at 146 to the arm 83 of the bell crank 80. Suitable fittings 147 and 148 are provided for the manifolds 110 and 111, and a flexible tube 149 communicates with a fitting 147 and with the outlet of the pump 13. A tube 150 is secured to the fitting 148 and communicates with the inlet 21 of the tank 18.

The operation, uses and advantages of the invention are as follows:

When the engine 14 is in operation, the pump 13 is being actuated to in turn cause flow of fluid through the connections therewith leading to the intake manifold past certain elements of the valves, out the exhaust manifold into the reserve tank 18, and in turn from the outlet of said reserve tank to the intake of the pump. Assuming the motor vehicle is standing still with the engine running, fluid under pump pressure will enter the intake manifold 110 through the transverse opening 118 into the annular port 112 of the housing 108, thence communicating with the transverse ports 127 through the ports 138 to the interior of the sleeve 135. The fluid will flow in turn through the longitudinal ports 140 into the space included between the spider end 139 of said sleeve valve and the cap 125. The fluid would likewise pass through the transverse ports 128 of the sleeve into the annular port 113 of the housing. The outlet manifold 111 is in communication with the port 113. Therefore, the arrangement so far provides for flow within the intake manifold through the by-pass ports which would include the ports 112, 118, 127, thence into the discharge ports 113 and 128. This is viewing the position of the valve in Figures 2 and 7. Fluid under pressure would likewise be directed by the intake manifold into the ports 115, 119 and 130 into the space included between the two valves 136 and 137, thence through the ports 129 and 131 of the sleeve, which ports communicate with the ports 98 and 99 which, through suitable connections, lead to ends of the cylinder 87 and on opposite sides of the piston 92. It will be seen that the fluid under pressure is directed substantially equally in two directions so that the fluid pressure on both sides of the piston and within the cylinder is the same. The fluid used may be oil, although within the purview of the invention, I do not wish to necessarily confine myself to an incompressible fluid.

In future description, I will use the terms "liquid" and "oil" in place of the term "fluid", as it renders the description of the operation in a certain measure easier to follow.

When the stem 141 is moved, the three valves are simultaneously moved, as previously set forth. It is also to be recalled that the sleeve is provided with a plurality of angularly arranged ports 133 and 134. If the vehicle is running upon the road and the operator thereof should desire to turn to the right, say a gradual turn, the steering wheel 4 would, of course, be turned to the right the proper degree. The irreversible worm and sector arrangement 5 would tend to rotate the worm wheel shaft 25 anti-clockwise, viewing the shaft in Figure 2. This movement of the shaft will likewise produce a swinging movement of the primary steering arm to the right, viewing Figure 2. The primary steering arm carries the bifurcated member 38. Movement of this bifurcated member will, through the medium of the resiliently actuated pin 59 by its engagement with the secondary steering arm, move the secondary steering arm likewise to the right and substantially at the same time that the primary steering arm is moved. As long as arm 26 moves in unison with arm 32, no relative motion takes place between members 63 and 71, and the valve is not operated, the steering being manual.

When resistance to the turning action is great, the primary steering arm loses its central relationship relative to the secondary arm, thereby causing movement of the valve. The valve then exhausts liquid from one side of the piston, while admitting liquid to the other side. Thus, the piston moves with the primary and secondary arms, exerting force on the latter and continues to do so until it re-establishes the central or a neutral relationship between the primary and secondary arms, thus restoring the valve to its neutral position. Movement of the secondary steering arm to the right will move the piston 92 within the cylinder in the direction of the closure cap 89. The thrust rod 6 is associated with the secondary steering arm through the ball and socket arrangement 36 and 37, as see Figure 4, and therefore the thrust rod will be moved when the secondary steering arm is moved to in turn cause movement of the wheels 2 and 3, through the several connecting elements 7 to 10, inclusive. This movement, as so far described would tend to increase the pressure against the oil to the right of the piston 92 and to likewise allow more oil to enter the cylinder to the left of the piston. Thus, the oil would be returned through the connection 105, through the port 99 into the space included between the valves 136 and 137. However, if steering should be difficult or the primary steering arm is rocked or moved suddenly to the right, the shaft 68 is rotated clockwise due to the fact that the secondary arm does not immediately follow movement of the primary arm. It is to be remembered that the primary steering arm carries the extended arm 61 provided with a bifurcated end 63, between the bifurcations of which end is received the stud 71 carried by the collar 69, which is fastened to the shaft 68; further, that this shaft 68 is supported by brackets 64 and 66 secured to the secondary steering arm so that any rocking movement of the secondary steering arm will likewise produce like rocking movement of the brackets and the shaft 68 carried thereby. This shaft which has been rotated clockwise, will produce rotation of the lever 73, which lever carries the stud 76 provided with a ball head 77. In the position of Figure 2, it will be noted that this ball head substantially lies in the longitudinal axis of the shaft 25. Hence, when the primary and secondary steering arms are rotated, the ball will remain in its longitudinal axis, and no off-center relationship will occur tending to cause binding of the parts of the apparatus. However, as the shaft is rotated, the ball head will tend to follow a given arc away from the longitudinal axis of the shaft 25 (see plan view of Figure 3), wherein it will be seen that while the ball is in the position shown in Figure 2, yet movement of the shaft will cause the ball to move in an arc relative to the longitudinal axis of the shaft 25. However, this movement is slight and in actual practice, will never cause any binding of the parts, as previously stated. The arm 81 of the bell crank 80 is formed with a split socket 82 for receiving the ball. Hence, as the lever 73 moves clockwise, the bell arm 81 will be rotated anti-clockwise, to in turn rock the lever 83 to the left, viewing Figure 3. This movement to the left will likewise cause movement of the stem members 141 and 143 through the medium of the turn-buckle 144 to the left and as the stem 140 is directly associated with the valves 135, 136 and 137, these valves will be moved to the left a given amount. Oil then enters the intake manifold, through the by-pass ports which include the ports 112 to 118 and 127, through the sleeve valve ports 138 within the sleeve and out through the discharge ports 128 and 113 into the manifold 111. After the sleeve valve has moved to the left, viewing Figure 2, the ports 138 of said valve now overlap the ports 127 of the sleeve and tend to restrict passage of oil through said ports. At the same time, oil is passing through the inlet ports 115, 119 and 130 to the space included between the two valves 136 and 137 but inasmuch as these valves have likewise moved to the left in step with movement of the sleeve valve 135, more oil is being passed through the port 98 behind the piston 92 for the reason that the ports 133 are being opened and the ports 131 are being closed or lapped. The escape of liquid forward of the piston 92 through the port 99 is, therefore, regulated on the exhaust side of the valve arrangement. If movement becomes extensive enough, the ports 138 of the sleeve valve 135 will completely be closed, the ports 127 being lapped, at which time the ports 133 and 129 will be open and certain of the ports 134 progressively opened during said movement so that the oil is by-passed to the right of the valve 137 through the ports 117 and 132 into the outlet manifold 111. At this time, it is apparent that any liquid included between the cap 125 and the sleeve valve will be by-passed through the ports 140 and any oil, if confined in this space, is permitted to flow through the ports 113 and 128, called the discharge ports, into the outlet manifold 111. It is perhaps unnecessary to state that the oil would be conducted through the flexible connection 150 from the outlet manifold, back to the housing or reserve tank 118, thence to the pump where the oil is recirculated into the intake manifold 110.

If an opposite turning movement is desired, it is apparent that opposite movement of the valves and likewise of the piston would occur. Thus, if a turning movement of the wheels to the left was desired, the valves would move to the right of the showing of Figure 2 and the piston 92 to the left. The ports 128, 130 and 132 are never overlapped by the valves. These ports are known as the discharge, inlet, and discharge, respectively. The by-pass set of ports are overlapped during certain movement of the sleeve valve 135, to the end that more oil is directed through the inlet ports to cause increased pressure on one or the other side of the piston 92, depending upon the turning direction desired for the wheels of the vehicle. The ports in the valve sleeve leading to the cylinder at opposite ends thereof are adapted to be progressively opened or closed, depending upon movement of two valve members and, as previously stated, the relationship is such that movement of the piston 92 within its cylinder is controlled by regulating the outlet or escape of liquid in front of the piston. It has been found that this gives more positive action and better control of the device.

The springs or resilient members adapted to maintain the pins 51 against sides of the secondary steering arm are of great importance and direct control of the valve is effected by these springs. The springs function to afford a neutral position for the secondary steering arm and also, as a further function, move when an excess pressure is required. As an example, if steering to the right was comparatively simple so that no particular excess pressure was required by the driver to turn the wheels, the booster mechanism would not of necessity operate, but the piston 92 would be permitted movement back and forth within the cylinder, the oil being by-passed, as has been previously described. However, if excess pressure is required to turn the wheels to the right, as given in the previous example, the primary or fixed steering arm would tend to tension the spring of the member 41 due to contact between the pin 59, and the secondary or floating arm. The pin 51 would not follow movement of the secondary steering arm, due to the shouldered arrangement that exists between said pin and the nut 44. This inward movement of the pin would, of course, turn the shaft 68 to a greater degree than it would ordinarily be turned if the primary and secondary steering arms had slight relative movement due to slight resistance to turning action. Therefore, under sudden requirement and excess load, the sleeve valve and the other two valves would be moved to their extreme positions where the by-pass port would be completely overlapped by the sleeve valve. However, when the pressure necessary for sudden turning is no longer required, the secondary steering arm would tend to again be restored to the position in alignment with the primary steering arm and the spring of the member 41 would no longer be in tension. When this happens, there will be a movement of the valves tending to allow a portion of the oil received in the intake manifold to by-pass into the exhaust manifold. There is, of course, a gradual lessening of oil pressure back of the piston 92.

To further elucidate, the re-establishment of the central or neutral relationship between the primary and secondary arms takes place when the driver has turned his steering wheel the desired amount, and either holds it in that position, or allows it to reverse its rotation to the position it takes when driving substantially straight ahead. In the event the steering wheel is held stationary after turning it, and the effort required to make the turn caused relative movement between the steering and primary arms (thus moving the valve from its central or neutral position), the piston will continue to be moved by the fluid pressure until it has restored the valve to the neutral or central position. The piston 92 in its movement restores the valve to its neutral position by moving the steering arm 62 through connections 93, 94, and 95, to a central position with respect to the furcations 39 and 40 on primary arm 26. Simultaneously, shaft 68 is rotated to the center of its arc of movement by means of the engagement of stud 71 with the forked end 63 of the arm 61, which is integral with the primary arm 26. Since the lever 73 is rigidly fastened to shaft 68, restoring shaft 68 to the center of its arc of movement also restores the bell crank 80 to the center of its arc of movement through the connection of the elongated split socket 82 on the end of arm 81, and the ball head 77 on lever 73. The opposite lever 83 of the said bell crank thus pulls or pushes on the valve by means of the connections 141 to 145, inclusive, thereby restoring the valve to its central or neutral position. The exception to this condition occurs when more effort is required to hold the front wheels in the desired position while rounding a turn than is exerted by one or the other of the springs. In this case, the valve is by-passing the flow from the pump, but has been moved slightly from its central position, and is so restricting the flow through the by-pass as to cause a fluid pressure against the piston exactly sufficient to hold the valve in the desired position. When the steering wheel is reversed to the straight ahead position after completing a turn, the valve may or may not be in its neutral position, depending on conditions. If the vehicle is traveling at a sufficient rate of speed to allow the normal castor action of the front wheels to restore them to the straight ahead position without assistance, the springs exert sufficient effort to hold the steering and primary arms in neutral or central relationship without relative movement, and both arms move as one with the steering gear shaft. When the vehicle is standing still, or traveling slowly, the castor action may not be sufficient to return the wheels to the straight ahead position, in which case the booster acts in the manner described to assist the act of turning.

The inclined or angular set of small ports 133 and 134 allows a soft gentle action of the piston 92 during movement thereof.

The operation of the device is automatic so far as the admission of liquid under pressure to the cylinder is concerned. Sudden turning of the wheels on the part of the driver is readily compensated through the springs of the members 41 or 42. Low pressure in the system is taken care of by greater movement of the slide valves to admit more liquid under pressure behind the piston, depending on the direction of turning movement of the wheels. In the case of high pressures in the lines due to driving the vehicle at a high speed, a slight movement of the steering wheel will produce sufficient pressure to aid in the steering by slight opening of the valve. In any event, the elongation of one or the other of the springs of the members 41 or 42 will determine the travel of the valves under conditions encountered by the driver.

If the booster system should fail to function, it is apparent that the steering of the vehicle is not affected in the least because the yoke or bifurcated member 38 carried by the primary steering arm closely surrounds the secondary steering arm. Therefore, leaks in the system, breakage of springs of one of the members 41 or 42, loss of the cylinder, or the like, would not in any way impair the mechanical steering of the vehicle.

I claim:

1. In a device of the character disclosed, a manually turnable shaft, two arms carried thereon, one of said arms being fixed to the shaft and the other of said arms floating thereon, said fixed arm provided with a yoke having two spaced apart legs and said floating arm being between said legs, resilient abutments between said legs of the yoke and the floating arm; each resilient abutment having a pin for push engagement with the floating arm, and a coil spring adapted to be tensioned when a pin is moved in one direction.

2. In a device of the character disclosed, a manually turnable shaft, two arms carried thereon, one of said arms being fixed to the shaft and the other of said arms floating thereon, said fixed arm provided with a yoke having two spaced apart legs and said floating arm being between said legs, resilient abutments between said legs of the yoke and the floating arm; each resilient abutment having a pin for push engagement with the floating arm, a coil spring adapted to be tensioned when a pin is moved in one direction, the opposite pin of the resilient abutment remaining stationary, and means for adjusting the position of said pins relative to the floating arm.

3. In a device of the character disclosed, a manually movable shaft, a pair of levers carried thereon, one of said levers being fixed to said shaft and the other of said levers floating on the shaft, a pair of arms provided with bearings spacedly secured to the floating lever, a shaft carried by the bearings of said arms, a collar provided with a tooth secured to said shaft, an arm carried by the fixed lever and extending at an angle relative thereto and provided with a bifurcated head adapted to receive said tooth; movement of the fixed arm relative to the floating arm rotating said shaft upon movement between said bifurcated head and tooth.

4. In a device of the character disclosed, a manually movable shaft, a pair of levers carried thereon, one of said levers being fixed to said shaft and the other of said levers floating on the shaft, a pair of arms provided with bearings spacedly secured to the floating lever, a shaft carried by the bearings of said arms, a collar provided with a tooth secured to said shaft, an arm carried by the fixed lever and extending at an angle relative thereto and provided with a bifurcated head adapted to receive said tooth; movement of the fixed arm relative to the floating arm rotating said shaft upon movement between said bifurcated head and tooth, an arm carried by one end of said shaft, a bell crank arm, means of connection between said bell crank arm and said arm carried by the shaft, whereby turning of the shaft turns the bell crank arm, and said means of connection being in alignment with the central axis of the manually movable shaft, in combination with fluid actuated means controlled as to movement by said bell crank lever.

5. In a device of the character disclosed, a manually movable shaft, a pair of levers carried thereon, one of said levers being fixed to said shaft and the other of said levers floating on the shaft, a pair of arms provided with bearings spacedly secured to the floating lever, a shaft carried by the bearings of said arms, a collar provided with a tooth secured to said shaft, an arm carried by the fixed lever and extending at an angle relative thereto and provided with a bifurcated head adapted to receive said tooth; movement of the fixed arm relative to the floating arm rotating said shaft upon movement between said bifurcated head and tooth, an arm carried by one end of said shaft, a bell crank arm, means of connection between said bell crank arm and said arm carried by the shaft, whereby turning of the shaft turns the bell crank arm, said means of connection being in alignment with the central axis of the manually movable shaft, a valve to be actuated by movement of the bell crank arm, and said means of connection between the bell crank arm and arm carried by the shaft due to its central position relative to the axis of the manually movable shaft and the levers carried thereby providing uniform valve travel.

6. In a device of the character disclosed, a manually turnable shaft, a pair of levers mounted on said shaft and normally in parallel alignment, the shaft acting as an axis therefor, one of said levers being fixed to the shaft and the other of said levers being oscillatable relative to the shaft and said fixed lever; a second shaft oscillatable in step with movement of the oscillatable lever, means between the fixed lever and said second shaft for rotating said second shaft when said levers are shifted from substantially parallel alignment, a valve to be moved, and means between the valve and the shaft carried by the oscillatable arm operable from a central point with respect to the axis of said manually movable shaft and the two levers carried thereby to cause uniform valve travel.

7. A device of the character disclosed, a valve including a housing provided with intake and outlet manifolds, a sleeve within said housing, both said sleeve and said housing provided with ports, a sleeve valve and a pair of spaced piston-type valves interconnected for like movement within said sleeve, said sleeve valve being formed with a port, two of said ports in said sleeve and housing communicating with the intake manifold and with the port of the sleeve valve and with the space included between the two piston valves, said sleeve and housing provided with a pair of spaced ports communicating with opposite sides of the two piston valves and with the outlet manifold, a cylinder having a piston therein to be moved by fluid under pressure, separate means of communication for ends of said cylinder and with spaced ports in said sleeve and housing of the valve and normally communicating with the space included between the two piston valves when the said valves are in a "neutral" position, a source for delivering fluid under pressure to said intake manifold and said fluid under pressure when said piston valves are in a "neutral" position, being passed through the ports in the valve housing and sleeve equally within the cylinder for centralizing the piston and likewise through the port in said sleeve into the ports communicating with the outlet manifold.

8. A device of the character disclosed, a valve including a housing provided with intake and outlet manifolds, said housing provided with ports, a sleeve valve and a pair of spaced piston-type valves interconnected for like movement within said housing, said sleeve valve being formed with a port, two of said ports in said housing communicating with the intake manifold and with the port of the sleeve valve and with the space included between the two piston valves, said housing provided with a pair of spaced ports communicating with opposite sides of the two piston valves and with the outlet manifold, a cylinder having a piston therein to be moved by fluid under pressure, separate means of communication for ends of said cylinder and with spaced ports in said housing of the valve and normally communicating with the space included between the two piston valves when the said valves are in a "neutral" position, a source for delivering fluid under pressure to said intake manifold and said fluid under pressure when said piston valves are in a "neutral" position, being passed through the ports in the valve housing equally within the cylinder for centralizing the piston and likewise through the port in said sleeve into the ports communicating with the outlet manifold, said piston valves and said housing both provided with ports of restricted area whereby when all of said pistons are moved in one direction, one set of ports of the said piston valve opens, the other of said ports decreasing in area and in such a manner that the piston to be moved within the cylinder is controlled as to movement by the passage of fluid from one side of said cylinder.

9. A device of the character disclosed, a valve including a housing provided with intake and outlet manifolds, said housing provided with ports, a sleeve valve and a pair of spaced piston-type valves interconnected for like movement within said housing, said sleeve valve being formed with a port, two of said ports in said housing communicating with the intake manifold and with the port of the sleeve valve and with the space included between the two piston valves, said housing provided with a pair of spaced ports communicating with opposite sides of the two piston valves and with the outlet manifold, a cylinder having a piston therein to be moved by fluid under pressure, separate means of communication for ends of said cylinder and with spaced ports in said housing of the valve and normally communicating with the space included between the two piston valves when the said valves are in a "neutral" position, a source for delivering fluid under pressure to said intake manifold and said fluid under pressure when said piston valves are in a "neutral" position, being passed through the ports in the valve housing equally within the cylinder for centralizing the piston and likewise through the port in said sleeve into the ports communicating with the outlet manifold, movement of the valves being simultaneous and in such a manner that fluid directed under pressure within the intake manifold through the sleeve valve to both sides of the piston valves leading to the outlet manifold may be gradually restricted as to passage, the fluid under pressure between the two piston valves being increased as to pressure.

MARION AMES GARRISON.